US012200460B2

(12) United States Patent
Chou et al.

(10) Patent No.: US 12,200,460 B2
(45) Date of Patent: Jan. 14, 2025

(54) ACTIVE SOUNDING DEVICE INTEGRATED INTO FLAT PANEL DISPLAY

(71) Applicant: Glass Acoustic Innovations Co., Ltd., New Taipei (TW)

(72) Inventors: Yao-Sheng Chou, New Taipei (TW); Hsiao-Yi Lin, New Taipei (TW); Yi-Feng Wei, New Taipei (TW)

(73) Assignee: Glass Acoustic Innovations Co., Ltd., New Taipei (TW)

( * ) Notice: Subject to any disclaimer, the term of this patent is extended or adjusted under 35 U.S.C. 154(b) by 177 days.

(21) Appl. No.: 17/888,495

(22) Filed: Aug. 16, 2022

(65) Prior Publication Data

US 2023/0053470 A1 Feb. 23, 2023

(51) Int. Cl.

| | |
|---|---|
| ***H04R 1/02*** | (2006.01) |
| ***H04R 7/04*** | (2006.01) |
| ***H04R 9/04*** | (2006.01) |

(52) U.S. Cl.

CPC ............... *H04R 7/045* (2013.01); *H04R 1/02* (2013.01); *H04R 9/047* (2013.01); *H04R 2499/15* (2013.01)

(58) Field of Classification Search

CPC .......... H04R 7/045; H04R 1/02; H04R 9/047; H04R 2499/15

See application file for complete search history.

(56) References Cited

U.S. PATENT DOCUMENTS

| | | | | |
|---|---|---|---|---|
| 6,332,029 | B1 * | 12/2001 | Azima | H04R 1/021 381/337 |
| 2007/0109505 | A1 * | 5/2007 | Kubara | G03B 21/10 348/E13.058 |
| 2020/0053441 | A1 * | 2/2020 | Kim | G06F 3/0412 |
| 2021/0029431 | A1 * | 1/2021 | Kim | H04R 7/045 |
| 2021/0409854 | A1 * | 12/2021 | Choi | G06F 3/16 |

* cited by examiner

*Primary Examiner* — Suhan Ni

(74) *Attorney, Agent, or Firm* — Chih Feng Yeh; Yongjean Consulting Inc.

(57) ABSTRACT

An active sounding device integrated into a flat panel display includes a glass diaphragm having a first surface on which a light emitting array and a touch panel are formed, a plurality of planar voice coils arranged on the second surface of the glass diaphragm opposite to the first surface, and a magnet assembly arranged below the plurality of planar voice coils, wherein the plurality of planar voice coils are electromagnetically coupled to the magnet assembly for converting received electrical signals into vibration signals of the glass diaphragm and making the flat panel display emitting sound.

12 Claims, 10 Drawing Sheets

ACTIVE SOUNDING DEVICE INTEGRATED INTO FLAT PANEL DISPLAY

CROSS-REFERENCE STATEMENT

The present application is based on, and claims priority from, Taiwan Patent Application Serial Number 110130881, filed Aug. 20, 2021, the disclosure of which is hereby incorporated by reference herein in its entirety.

BACKGROUND

1. Technical Field

The present invention relates to a sounding device, and more particularly, an active sounding device integrated into flat panel display.

2. Related Art

With the development of science and technology, sound generating units are widely used in various electronic devices. Conventionally, the sound generating unit is usually arranged under the display panel, the sound generating unit generally takes up a large space for generating better sound quality, otherwise the high-quality sound performance won't be achieved while the sound generating unit is too small. In addition, the sound generating unit is usually arranged around the corner area of the display panel, constraining the sound-emitting positions, and therefore limits user's listening experience.

At present, electronic devices are designed to have ultra-thin, narrow-rimed, and even full-screen displays, leaving less space for placing sounding device within them. However, traditional sounding device is relatively bulky and the installation position is limited inside newly developed electronic device. Therefore, it is difficult to have suitable spots for installing the sounding device in the display of the newly developed electronic device.

The concept of a flat sounding device is similar to a scaled-down version of a flat speaker, which has flat voice coils embedded with a thin diaphragm. The magnets are arranged on one or both sides of the diaphragm (push-pull type), and the diaphragm vibrates in the magnetic fields created by these magnets. The flat plate unit (diaphragm) printed with a fine conduction route is usually placed in magnetic fields generated by two plates installed with permanent magnets, and the electrical signals are fed to the printed fine conduction routes embedded on the diaphragm to generate positive and negative charges in the magnetic fields, because the entire diaphragm is evenly printed with conductive wirings. By circulating alternating currents in the conductive wirings of the diaphragm, the alternating currents interact with the magnetic fields to generate alternating forces perpendicular to both magnetic fields and the alternating currents due to Faraday's law. Under the action of the vibrating forces, enabling vibrations of the diaphragm to generate sound by converting the alternating-current signals into sound signals.

Therefore, there is a great need to develop a sounding device that can meet the requirements of display of current electronic devices and can integrate the above-mentioned concepts into a flat-panel display.

SUMMARY

Based on the above descriptions, the present invention at least proposes a sounding device to solve the deficiencies of the prior art, which can be integrated into a flat panel display. The sounding device includes a glass diaphragm having a first surface on which a light emitting array and a touch panel are formed, a plurality of planar voice coils arranged on the second surface of the glass diaphragm opposite to the first surface, and a magnet assembly arranged below the plurality of planar voice coils, wherein the plurality of planar voice coils are electromagnetically coupled to the magnet assembly for converting received electrical signals into vibration signals of the glass diaphragm and making the flat panel display emitting sound.

In one preferred embodiment, the plurality of planar voice coils are formed by a photolithography process and by a following metal deposition process.

In one preferred embodiment, the plurality of planar voice coils are conductive wires formed by silver (Ag), Indium Tin Oxide (ITO), Indium gallium oxide (IGO), or Indium Gallium Zinc Oxide (IGZO).

In one preferred embodiment, the magnet assembly includes a plurality of magnets arranged in a magnet array.

In one preferred embodiment, magnetic polarity of individual magnet of the magnet array is arranged alternatively.

In one preferred embodiment, the sounding device further including a suspension device and a frame, wherein the glass diaphragm is tightly sealed to the frame through the suspension device to form an airtight space in said frame.

In one preferred embodiment, the magnet assembly is arranged in an accommodation space inside the frame.

In one preferred embodiment, the light emitting array is a sub-millimeter light emitting diode (mini-LED) or an organic light emitting diode (OLED) array.

In one preferred embodiment, the light emitting array is electrically connected to a drive circuit by an anisotropic conductive adhesive film through a plurality of through holes located in the glass diaphragm to join a flexible circuit board.

In one preferred embodiment, the sounding device further includes an acceleration sensing device disposed on said glass diaphragm to detect vibrating signals generated by said glass diaphragm.

In one preferred embodiment, the acceleration sensing device is electrically connected to an amplifier of a drive circuit for driving the plurality of planar voice coils, the amplifier amplifies the vibration signals and thereby excites the planar voice coils on the glass diaphragm.

In one preferred embodiment, the acceleration sensing device, the amplifier, and the planar voice coils on the glass diaphragm form a feedback loop for amplifying and adjusting the sound of said sound generating device, thereby optimizing sound quality of the sound of said sound generating device.

In one preferred embodiment, the suspension device is made of flexible material.

In one preferred embodiment, the flexible material is rubber.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As previously described in the background section, the planar sounding device is similar to a size-reduced planar speaker, and the planar voice coils can be formed on a thin diaphragm in a form of printed circuit. The magnets are arranged on one side or both sides of the diaphragm (push-pull type). When the electrical signals (converted by the original sound signals) are fed to the plane voice coils formed on the diaphragm, the currents flowing inside the plane voice coils are orthogonal to the magnetic fields generated by the magnets. By circulating alternating currents in the conductive circuit with conductive wirings due to the fed electrical signals, the alternating current interacts with the magnetic fields to generate alternating forces perpendicular to both magnetic fields and the alternating currents due to Faraday's law. Under the action of the vibrating forces, enabling vibrations of the diaphragm to generate sound by converting the alternating-current signals into sound signals. For example, U.S. Pat. No. 8,447,063 B2 disclosed a flat thin dynamic speaker comprising a motor unit, a suspension unit, a radiating unit and a frame arranged in such a manner that the motor unit and the suspension unit are on the same plane while the radiation unit is located on top of the motor unit so that the thickness of the speaker assembly is reduced while the performance of the speaker assembly is maintained or even improved. Since glass has the light weight and high strength diaphragm characteristics, it has the potential to develop a wide sound range.

The glass diaphragm made of reinforced glass has high electro-acoustic conversion efficiency (because of its high mechanical strength, low density, and fast sound traveling speed characteristics), and a wider operating frequency range (because of its strong rigidity, it can reduce split vibration and small deformation at low frequencies), good sound quality/timbre, and good processing properties. The main portion of display of the electronic device is made of glass. Therefore, the present invention proposes a sounding device that integrates a sound generating unit into a flat panel display, and utilizes the glass of the flat panel display as a diaphragm.

Figure 1:
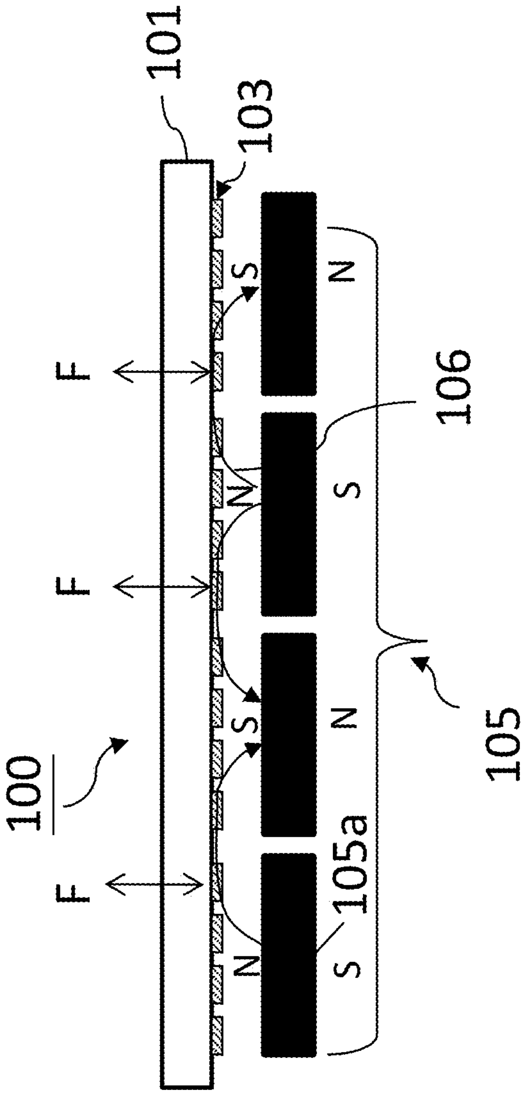
FIG. 1 illustrates a side view of a main portion of an active sounding device integrated into a flat panel display according to one embodiment of the present invention.

FIG. 1 illustrates a side view of a main portion of an active sounding device 100 integrated into a flat panel display. As depicted in FIG. 1, the sounding device 100 uses the glass substrate of the display panel as the vibrating body (diaphragm), namely the glass diaphragm 101, and applies photolithography process and following metal deposition process on the glass surface of the non-display/light-emitting side of the display to manufacture flat sound coils 103, a magnet assembly 105, typically arranged in form of magnet array by a plurality of magnets, is arranged under the glass diaphragm to generate magnetic fields. The glass diaphragm 101 drives the display panel to vibrate and emit sound under the interaction between the generated magnetic fields and the flat sound coils 103 formed on the glass diaphragm 101. The planar voice coils 103 combined with the magnet assembly 105 disposed below it can be used as an actuator or an exciter to drive the display screen, acted as a diaphragm, to vibrate and emit sound, where the planar voice coils 103 electrically coupled to a sound source are fed with the electrical signals.

In one embodiment, the planar voice coils are conductive routes made of material chosen from the group of silver (Ag), Indium Tin Oxide (ITO), Indium Zinc Oxide (IZO), Indium Gallium Zinc Oxide (IGZO), etc., but not limited thereto.

In one embodiment, the magnet assembly 105 is a magnet array including a plurality of magnets. The magnetic poles of the individual magnet units **105*a* of the magnet array near the planar voice coil 103 form a north (N) and a south (S) staggered arrangement to generate magnetic field lines 106 as shown in the figure, which shows the corresponding magnetic field directions. Since only the currents of the voice coils 103 flowing in the directions that are perpendicular to the magnetic field in the proximity of the voice coils 103, i.e. in or out of the paper-plane direction, can generate Lorentz force F alternating in the up-down directions. The glass diaphragm 101** can therefore be driven to vibrate and emit sound due to the action of F.

According to the concept of the present invention, the glass diaphragm 101 is a display panel, such as LED display, mini-LED display, OLED display, or the like.

Figure 2A:
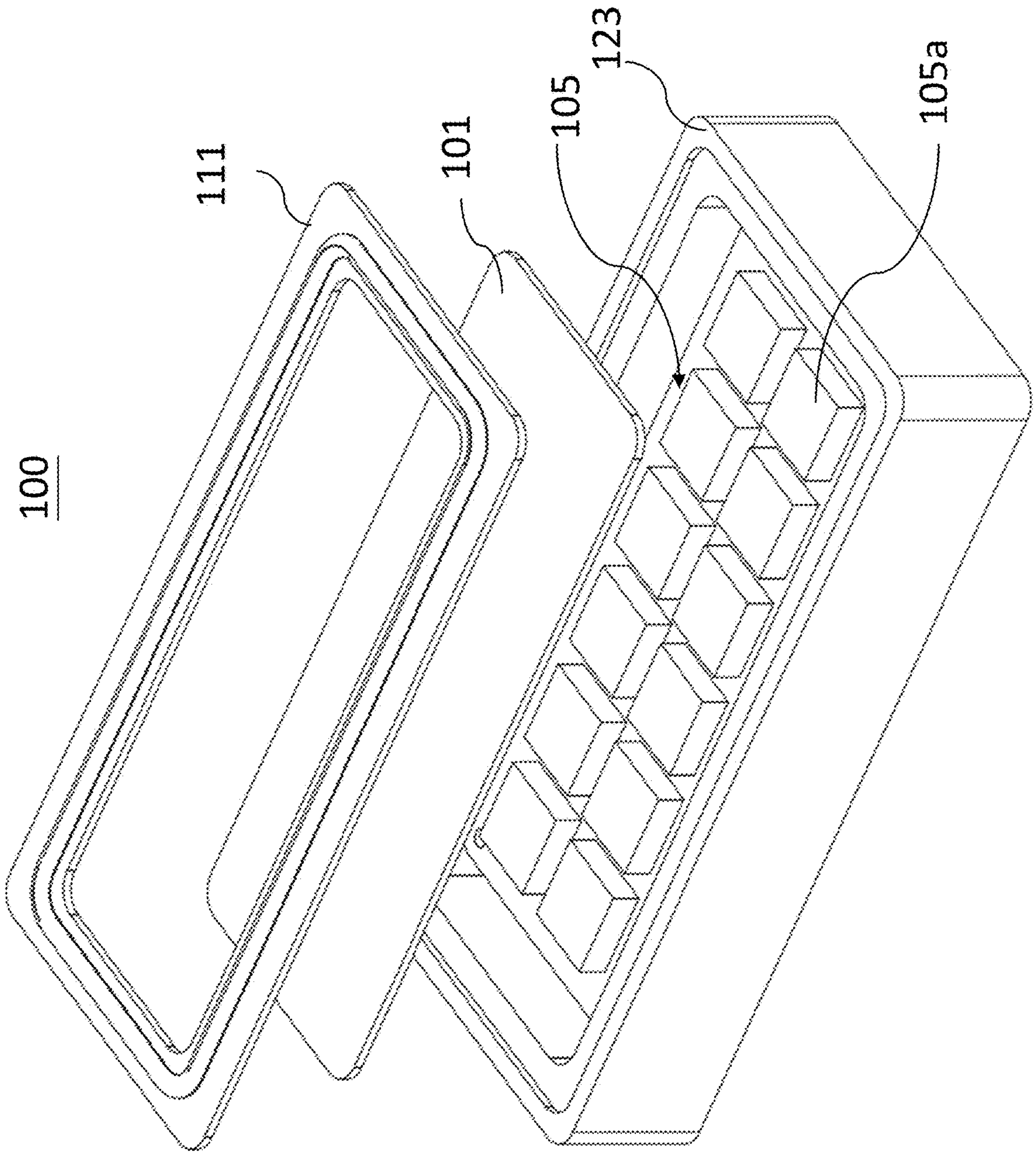
FIG. 2(A) illustrates an exploded schematic diagram of an active sounding device integrated into a flat panel display according to one embodiment of the present invention.

FIG. 2(A) illustrates an exploded schematic diagram of an active sounding device 100 integrated into a flat panel display, which includes a glass diaphragm 101, a rubber suspension device 111, and a magnet assembly 105 disposed in an accommodating space inside a frame 123. The magnet assembly 105 includes a plurality of magnets **105*a*** in form of an array.

Figure 2B:
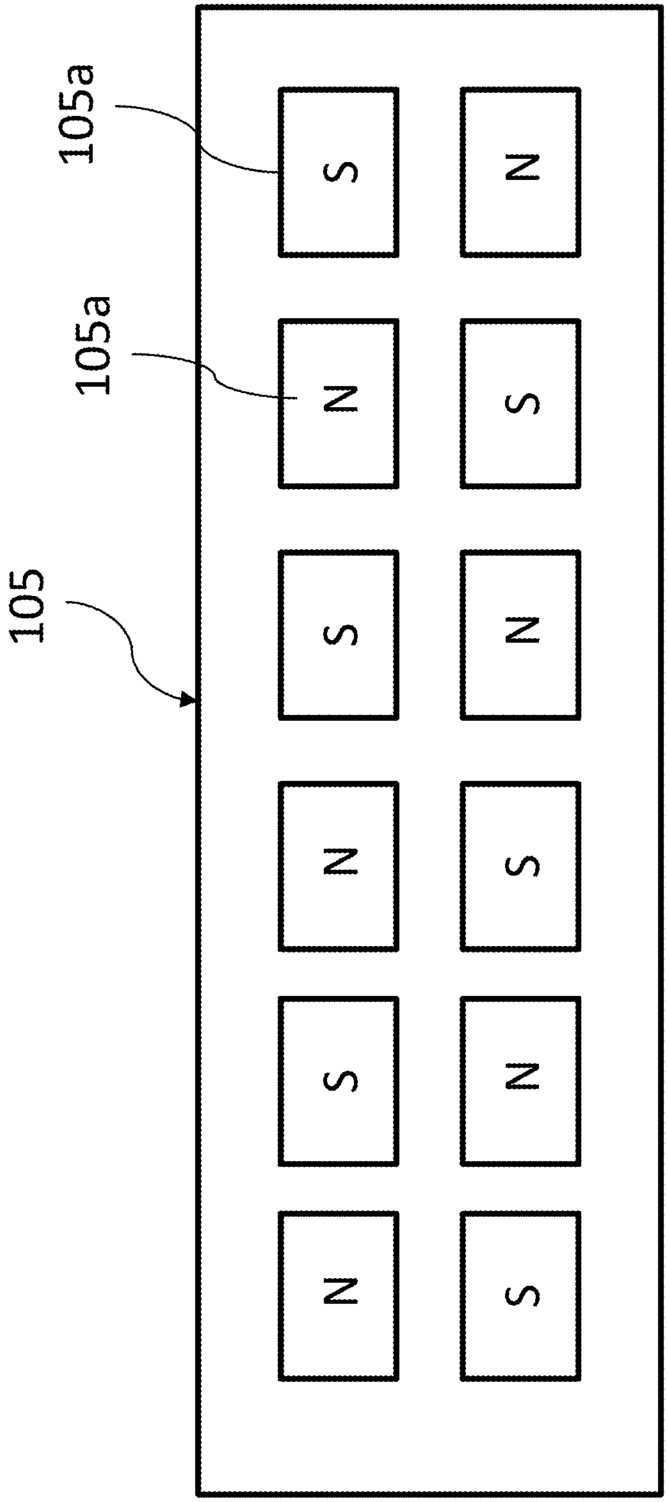
FIG. 2(B) illustrates a top view of a magnet assembly of an active sounding device integrated into a flat panel display according to one embodiment of the present invention.

FIG. 2(B) illustrates a top view of the magnet assembly 105. The plurality magnets are magnetized such that magnet faces with different polarities are mutually adjacent positioned, and are provided at predetermined spacing. The magnetic poles of the plurality of individual magnet 105*a* form a north (N) and a south (S) staggered arrangement.

Figure 2C:
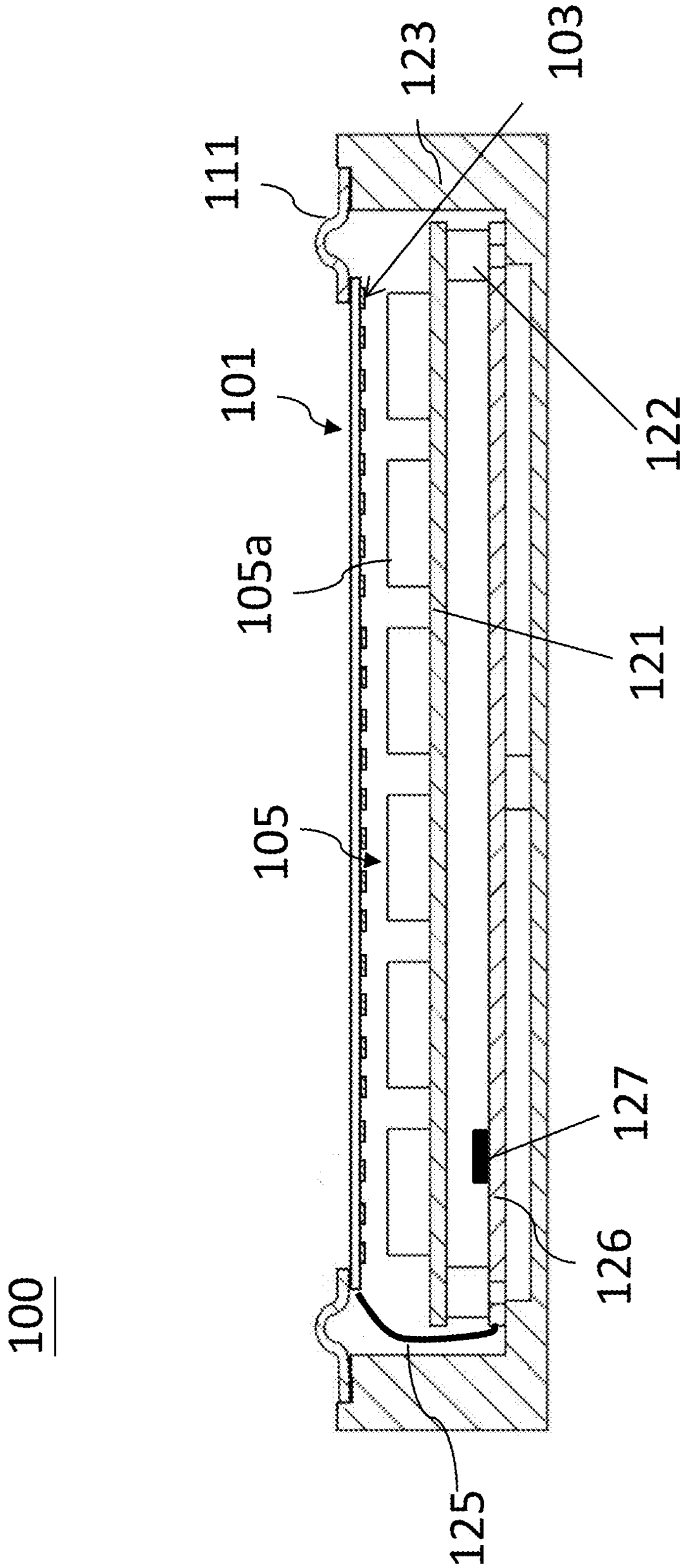
FIG. 2(C) illustrates a cross-sectional view of an active sounding device integrated into a flat panel display according to one embodiment of the present invention.

FIG. 2(C) illustrates a cross-sectional view of an active sounding device 100 integrated into a flat panel display, where the glass diaphragm 101 is tightly sealed to the frame 123 through the rubber suspension device 111 to form an airtight space inside the frame 123. In a preferred embodiment, a rigid circuit board 126 is installed at the bottom of the frame 123, and the magnet assembly 105 is disposed on a substrate 121, which is pivotally connected to the rigid circuit board 126 through a plurality of pillars 122.

Figure 2D:
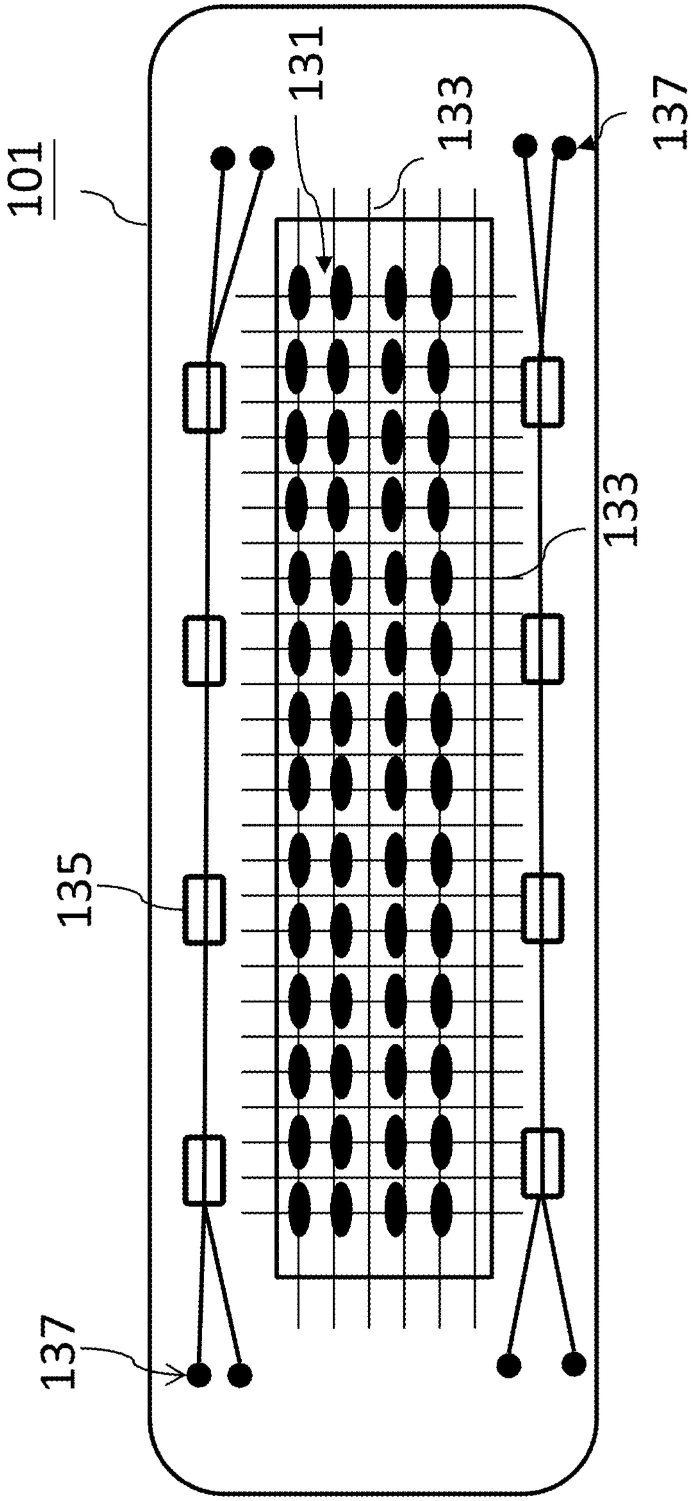
FIG. 2(D) illustrates a top view of a glass diaphragm (display panel) of an active sounding device integrated into a flat panel display according to one embodiment of the present invention.

FIG. 2(D) shows a front view of the glass diaphragm (display panel) 101, which includes a light-emitting array 131 and corresponding wirings 133. The image display of the light-emitting array 131 is driven and controlled by the image driver IC 135, and the image driver IC 135 electrically connected to the rigid circuit board 126 via the plurality of through holes 137 on the glass diaphragm (display panel) 101.

Figure 2E:
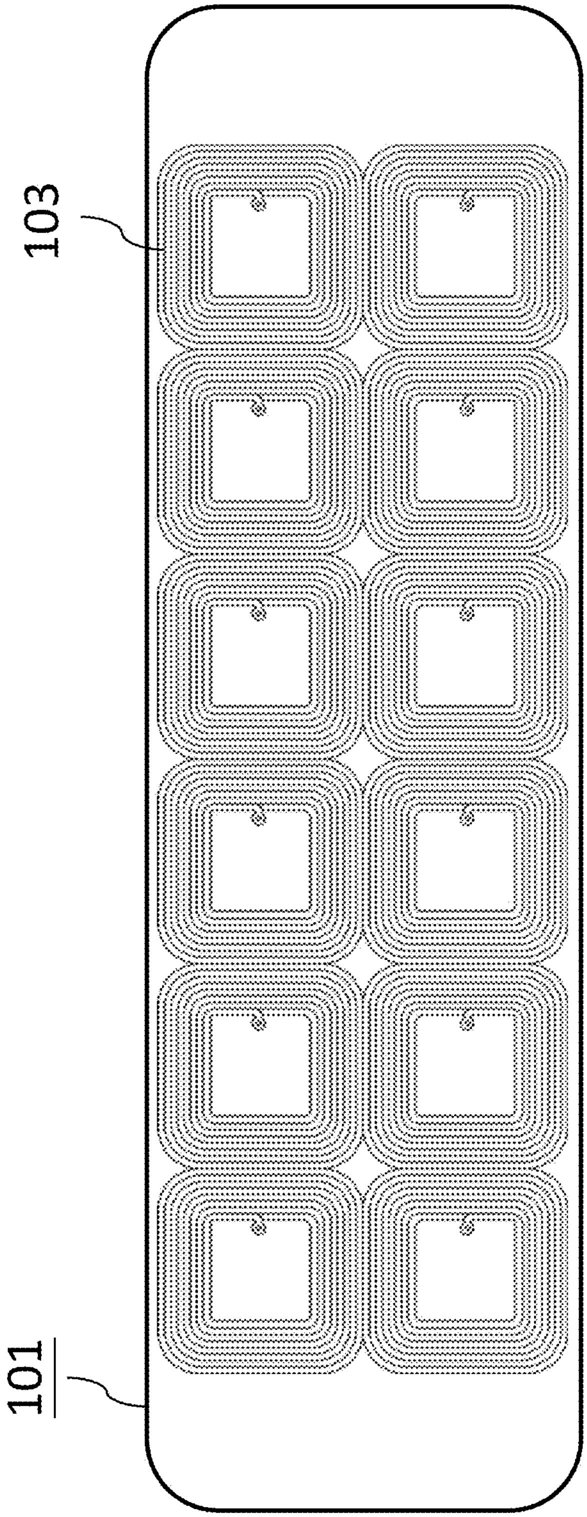
FIG. 2(E) illustrates a bottom view of the glass diaphragm (display panel) of an active sounding device integrated into a flat panel display according to one embodiment of the present invention.

FIG. 2(E) shows a bottom view of the glass diaphragm (display panel) 101. A plurality of planar voice coils 103 are formed on the second surface (lower surface) of the glass diaphragm (display panel) 101 by a photolithography process and a following metal deposition process.

In a preferred embodiment, the glass diaphragm 101 is a display panel, where its first surface (upper surface) is configured for placing the light-emitting diode array, corresponding wiring, driver IC, etc. of the display screen, and its second surface (lower surface) having a plurality of planar voice coils 103 formed by a photolithography process and a following metal deposition process. The wiring assembly of the glass diaphragm (display panel) 101, including the planar voice coils 103 and the wiring assembly connecting the driver IC, is electrically connected to the rigid circuit board 126 through a flexible circuit board 125, and the rigid circuit board 126 may include a microprocessor 127, a D/A converter, an audio/video signal processing unit, etc. used to provide audio signals, video signals, etc. to the glass diaphragm (display panel) 101.

Figure 3:
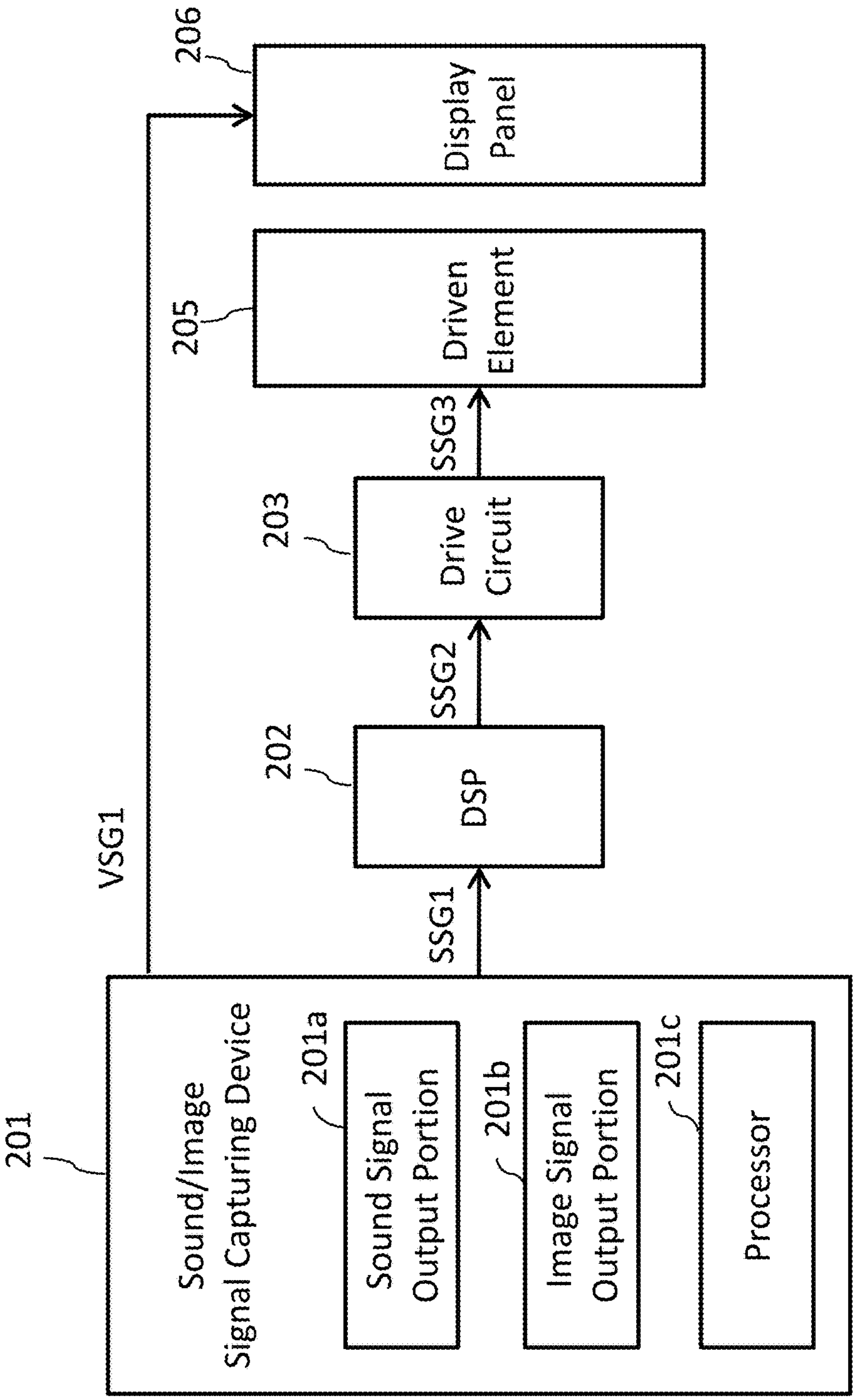
FIG. 3 shows a functional block diagram of operating a sounding device integrated into a flat panel display proposed in FIG. 1 according to one embodiment of the present invention.

FIG. 3 shows a functional block diagram of operating a sounding device integrated into a flat panel display proposed in FIG. 1. The sounding device shown in FIG. 3 includes a driven element (actuator or exciter) 205 and a display panel 206. The display panel 206 includes a display panel such as LED, mini-LED, OLED, etc., which includes: i) a function of outputting sound from the display panel 206; ii) a function of displaying images on the display panel 206.

An audio/image capturing device 201 includes an audio signal output portion 201*a*, an image signal output portion 201*b*, and a processor 201*c* for executing software installed. In a preferred embodiment, the audio/video capture device 201 may be an audio-video card integrating audio and video signal-capturing functions.

The audio signal output unit 201*a* of the sound/image capturing device 201 outputs the sound signal SSG1 to a digital signal processor (DSP) 202. The sound signal output portion 201*a* may generate the sound signal SSG1, or may obtain the sound signal SSG1 from an external electronic device.

The image signal output portion 201*b* outputs the video signal VSG1 to the display panel 206. The image signal output portion 201*b* may generate the video signal VSG1, or may obtain the video signal VSG1 from an external electronic device.

The digital signal processor 202 changes the quality of the sound output from the sounding device shown in FIG. 2. By performing various types of signal processing of the sound signal SSG1, the signal processing shown in FIG. 2 can be realized. For example, the digital signal processor 202 includes an equalizer function that changes the frequency characteristics of the sound signal. The digital signal processor 202 converts the sound signal SSG1 into a sound signal SSG2 by performing various types of signal processing on the sound signal SSG1, and then outputs the sound signal SSG2 to the drive circuit 203.

The drive circuit 203 includes a digital/analog (D/A) converter and an amplifier. The D/A converter of the drive circuit 203 converts the sound signal SSG2, which is a digital signal, into an analog signal. Different from this embodiment, a D/A converter can be provided to the digital signal processor 202, and the drive circuit 203 can receive the sound signal SSG2 as an analog signal. The amplifier of the drive circuit 203 amplifies the analog signal generated by the D/A converter to generate the driving signal SSG3, and then outputs the driving signal SSG3 to the driven element 205. In one embodiment, the driven element 205 includes the planar voice coils 103 shown in FIG. 1 and the magnet assembly 105 electromagnetically coupled thereto.

Figure 4:
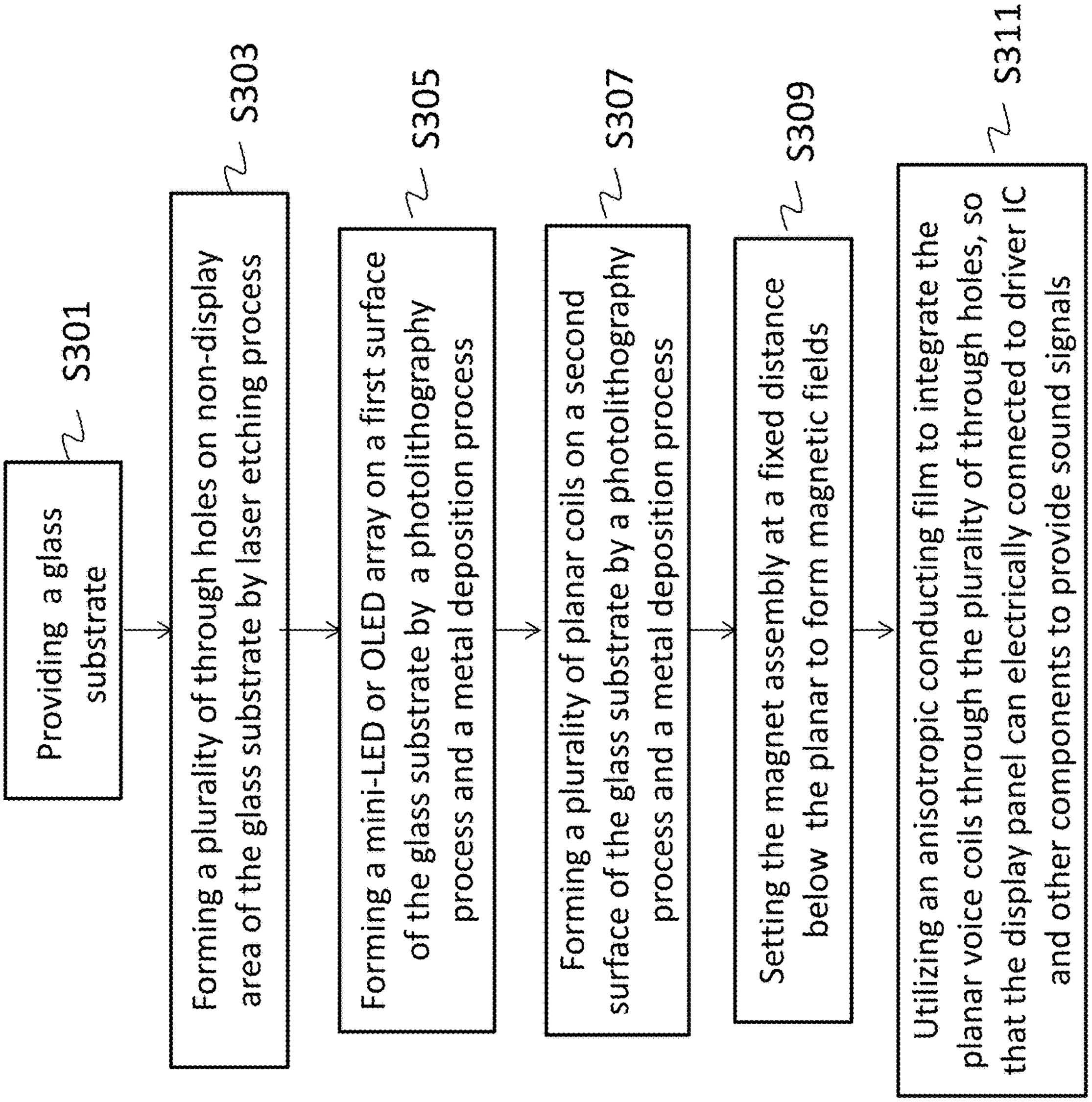
FIG. 4 shows a flowchart of fabricating a sub-millimeter light emitting diode/organic light emitting diode (mini-LED/OLED) array integrated into a glass diaphragm sounding device according to one embodiment of the present invention.

FIG. 4 shows a flowchart of fabricating a sub-millimeter light emitting diode/organic light emitting diode (mini-LED/OLED) integrated into a glass diaphragm sounding device. The active sounding device 100 (FIG. 1) uses the glass substrate of the display panel as the vibrating body (glass diaphragm). Here, a mini-LED or an OLED is used as an example to illustrate how to integrate and manufacture a sounding device into the glass diaphragm. In one embodiment, a glass substrate is first provided (step S301), and a plurality of through holes are formed on a predetermined non-display area (usually at the outer edge) of the glass substrate by laser etching technology (step S303), and then a photolithography process and a following metal deposition process are used to form a mini-LED or OLED array on a first surface of the glass substrate (step S305), followed by another photolithography process and another following metal deposition process are used to form a planar voice coils on the second surface of the glass substrate (on the opposite side of the first surface) (step S307), the magnet assembly is set at a fixed distance below the planar voice coils to form magnetic fields (step S309), and an anisotropic conducting film (ACF) is used to electrically connected to the flexible circuit board through the plurality of through holes located on the non-display area of the glass substrate to integrate the planar voice coils with the rigid circuit board, so that the microprocessor and other components such as D/A converter, digital signal processor installed on the rigid circuit board are electrically connected to the display panel to provide it with sound signals, video signal, etc. (step S311).

The aforementioned fabrication process takes a glass substrate as an example. According to the concept of the present invention, such as other glass-like transparent substrates on which mini-LEDs or OLEDs can be fabricated. For example, a sapphire substrate can also be used to fabricate a sounding device integrated into a transparent substrate diaphragm by applying steps similar to S303, S305, S307, S309, and S311.

Figure 5A:
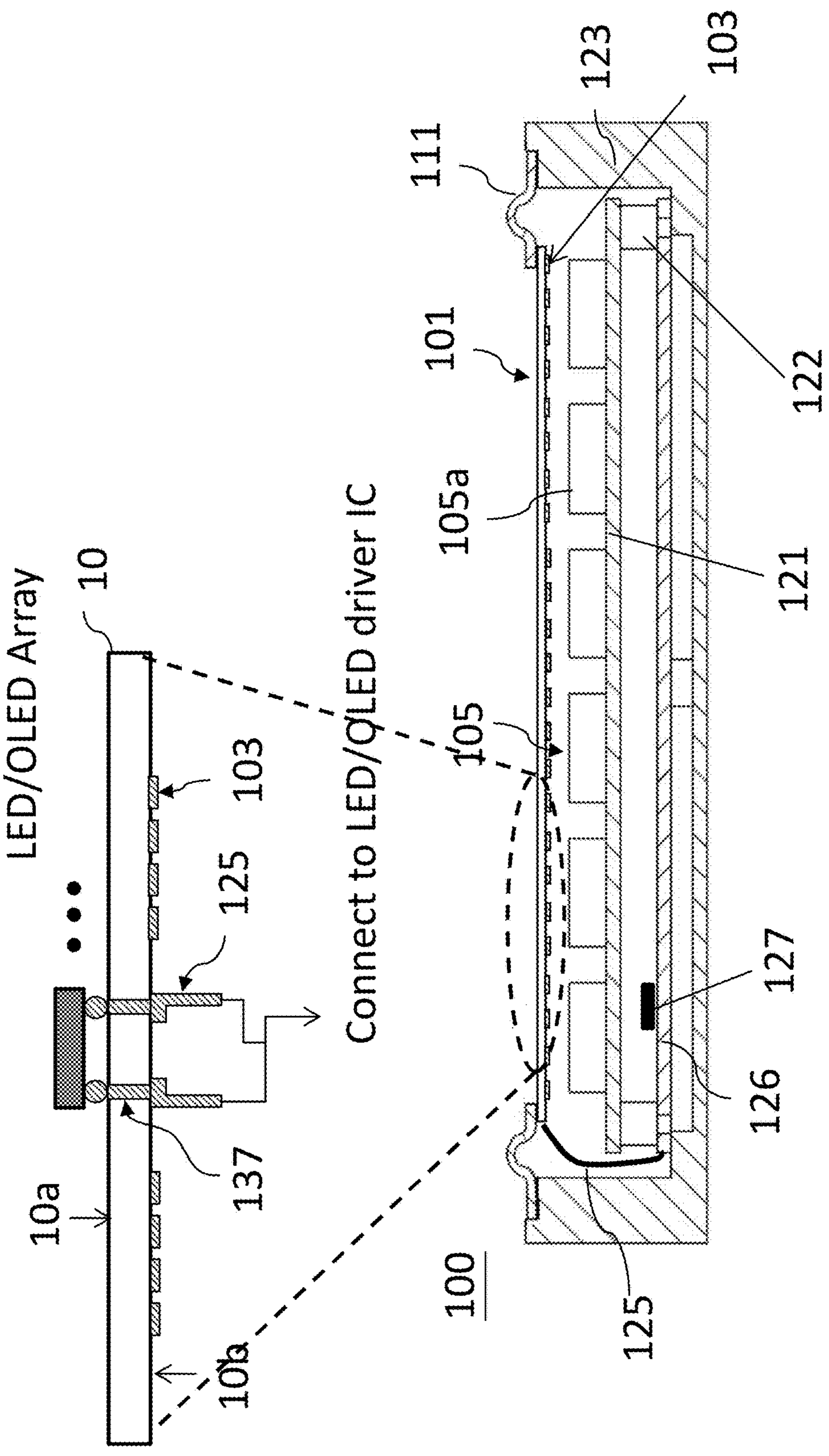
FIG. 5(A) shows a structural side view of an active sounding device having mini LED/OLED integrated into a glass diaphragm according to a preferred embodiment of the present invention.

FIG. 5(A) shows a structural side view of an active sounding device having mini LED/OLED integrated into a glass diaphragm. Similar to the aforementioned ideas, the active sounding device 100 uses the glass substrate of the display panel 101 as the vibrating body (glass diaphragm), and utilizes the photolithography process and metal deposition process on the glass surface of the non-display/light-emitting side of the display panel 101 to form plane voice coils 103, and a magnet assembly 105 is arranged under the glass diaphragm (display panel) 101 to generate magnetic fields. In one embodiment, the glass diaphragm (display panel) 101 is tightly sealed to the frame 120 through the rubber suspension device 111 to form an airtight space inside the frame body 123, and the magnet assembly 105 can be disposed on the substrate 121. The substrate 121 is fixed to the frame 123 by a plurality of pillars 122.

The enlarged portion of the dotted circled area depicted in FIG. 5(A) shows a side view demonstrating the structure of the mini LED/OLED integrated into the glass diaphragm. As mentioned in the related description of FIG. 4 regarding to the manufacturing process flow chart, a glass substrate 10 is pre-fabricated with a plurality of through holes 137 in a predetermined non-display area (usually located at the outer edge) by a laser deep etch process, and then a photolithography and a metal deposition process are used to form a mini-LED or OLED array and a touch array of a display panel on the first surface 10*a* of the glass substrate, and then planar voice coils 103 are fabricated on the second surface 10*b* of the glass substrate by a photolithography process and a metal deposition method. The anisotropic conductive adhesive film is bonded to the flexible printed circuit (FPC) 125 through the plurality of through holes 137 located in the non-display area of the glass substrate. The planar voice coils 103 are also electrically integrated into the flexible circuit board 125, so that the microprocessor 127 and other components such as D/A converter, digital signal processor, audio/video signal output devices installed on the rigid circuit board 126 are electrically connected to the display panel to provide it with audio/video signals, and the like.

Figure 5B:
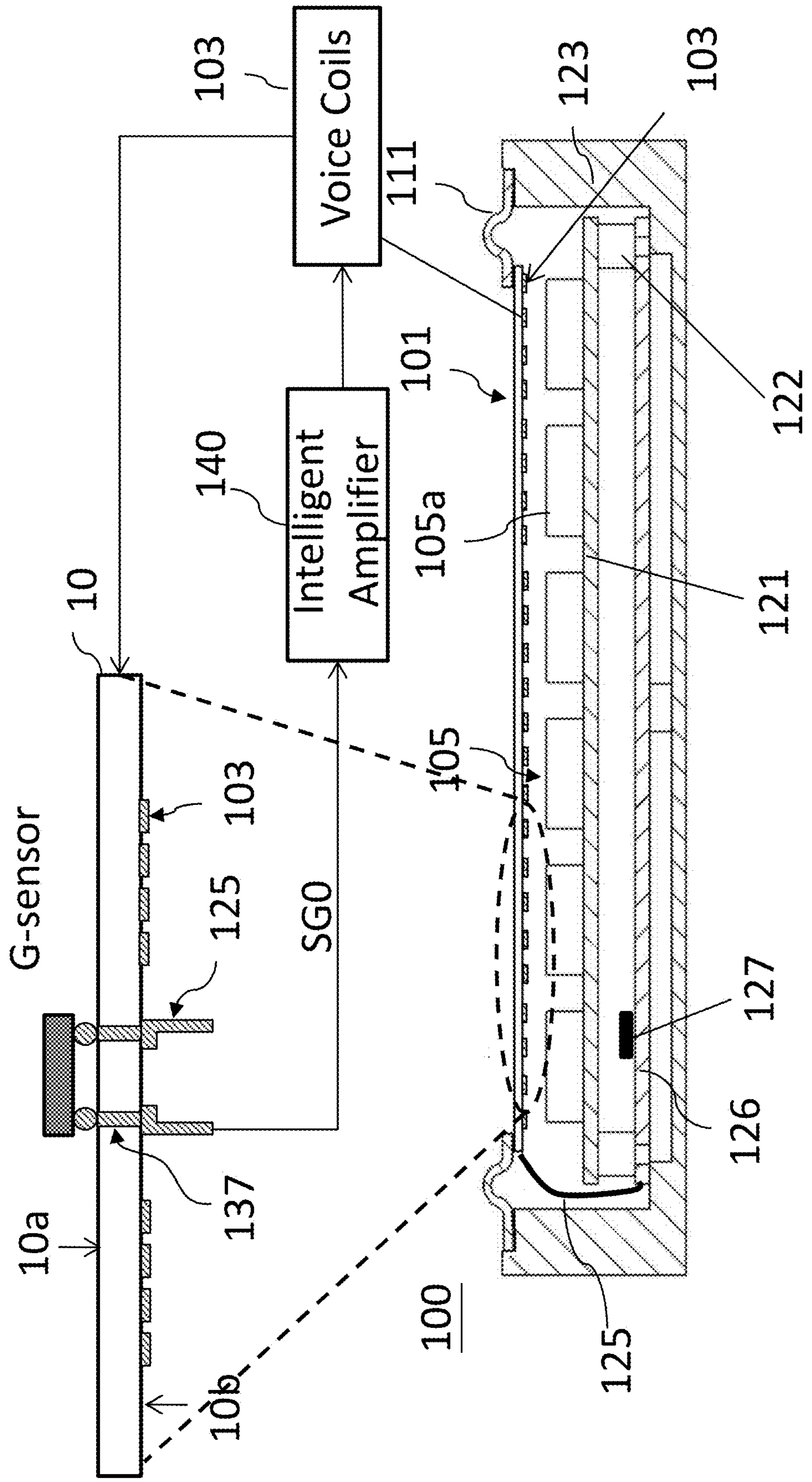
FIG. 5(B) illustrates a side view showing an acceleration sensing device (G-sensor) disposed on the glass diaphragm located on the same side as the mini-LED or OLED array did according to a preferred embodiment of the present invention.

In order to instantly feedback the vibration signals in the glass diaphragm (display panel) 101, as shown in FIG. 5(B), an acceleration sensing device (G-sensor) is used to detect the vibration signals SG0 of the glass diaphragm. The vibration signals SG0 are fed back to the intelligent amplifier 140 of the drive circuit, and the intelligent amplifier 140 amplifies the vibration signals and thereby excites the planar voice coils 103 on the glass diaphragm. Therefore, a feedback loop formed by the acceleration sensing device (G-sensor) installed on the glass diaphragm, the intelligent amplifier 140 of the drive circuit, and the plane voice coils 103 on the glass diaphragm can effectively amplify and adjust the output sound of the sounding device, thereby optimizing the output sound quality.

At present, circular sub-millimeter light-emitting diode/organic light-emitting diode (mini-LED/OLED) displays are also available on the market for use in electric vehicles. Based on the same concept, the mini LED/OLED in the active sounding device of the flat panel display proposed in the present invention is integrated into the glass diaphragm, the display screen has a circular appearance, and a photolithography process and a metal process are used to fabricate planar voice coils with concentric circle or racetrack shape on the second surface of the glass substrate. The magnet assembly under the glass diaphragm can be used to form magnetic fields in a ring configuration.

It should be emphasized here that the various configurations of the magnet assembly described in FIG. 1 and FIG. 2 is based on how to optimize the configuration that makes the current flowing inside the planar voice coils orthogonal to the magnetic fields generated by the magnet assembly. Through the flow of alternating current in the planar voice coils, the planar voice coils generate forces that follows Faraday's law, and under the action of the forces, the sounding device integrated into the glass diaphragm vibrates in the vertical directions (both up and down directions), thereby generating vibration.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. An active sounding device integrated into a flat panel display, said device comprising:
- a glass substrate of said flat panel display acting as a glass diaphragm having a first surface and a second surface;
- a plurality of planar voice coils arranged on said second surface of said glass diaphragm opposite to said first surface; and
- a magnet assembly arranged below said plurality of planar voice coils, wherein said plurality of planar voice coils are electromagnetically coupled to said magnet assembly to convert received electrical signals into vibration signals of said glass diaphragm and to make said flat panel display emitting sound, wherein said magnet assembly includes a plurality of magnets arranged in a magnet array, wherein magnetic polarity of each magnet of said plurality of magnets is arranged alternatively.

2. The active sounding device integrated into a flat panel display of claim 1, wherein said plurality of planar voice coils are formed by a photolithography process and by a following metal deposition process.

3. The active sounding device integrated into a flat panel display of claim 2, wherein said plurality of planar voice coils are conductive wires formed by silver (Ag), Indium Tin Oxide (ITO), Indium gallium oxide (IGO), or Indium Gallium Zinc Oxide (IGZO).

4. The active sounding device integrated into a flat panel display of claim 1, further including a suspension device and a frame, wherein said glass diaphragm is tightly sealed to said frame through said suspension device to form an airtight space in said frame.

5. The active sounding device integrated into a flat panel display of claim 4, wherein said magnet assembly is arranged in an accommodation space inside said frame.

6. The active sounding device integrated into a flat panel display of claim 4, wherein said suspension device is made of flexible material.

7. The active sounding device integrated into a flat panel display of claim 6, wherein said flexible material is rubber.

8. The active sounding device integrated into a flat panel display of claim 1, wherein said flat panel display includes a sub-millimeter light emitting diode (mini-LED) or an organic light emitting diode (OLED) display.

9. The active sounding device integrated into a flat panel display of claim 8, wherein said flat panel display is electrically connected to a drive circuit by an anisotropic conductive adhesive film through a plurality of through holes located in said glass diaphragm to join a flexible circuit board.

10. The active sounding device integrated into a flat panel display of claim 1, further including an acceleration sensing device disposed on said glass diaphragm to detect vibrating signals generated by said glass diaphragm.

11. The active sounding device integrated into a flat panel display of claim 10, wherein said acceleration sensing device is electrically connected to an amplifier of a drive circuit for driving said plurality of planar voice coils, said amplifier amplifies said vibration signals and thereby excites said planar voice coils on said glass diaphragm.

12. The active sounding device integrated into a flat panel display of claim 11, wherein said acceleration sensing device, said amplifier, and said planar voice coils on the glass diaphragm form a feedback loop for amplifying and adjusting said sound of said sound generating device, thereby optimizing sound quality of said sound of said sounding device.

* * * * *